Patented Oct. 8, 1946

2,408,924

UNITED STATES PATENT OFFICE 2,408,924

PLANT EXTRACTS AND METHOD OF PRODUCING SAME

Ole Gisvold, Minneapolis, Minn., assignor to Regents of the University of Minnesota, Minneapolis, Minn., a corporation of Minnesota No Drawing. Application January 17, 1945, Serial No. 573,311

6 Claims. (Cl. 260—619)

This invention relates to the preparation of relatively pure extracts of plants of the species Larrea divaricata, suitable for use in pharmaceuticals and foods. Plants of the species. Larrea divaricata are sometimes also known as Larrea tridentata or Covillea tridentata, and are commonly known in the United States as "creosote bush." The term Larrea divaricata will be used herein.

It has been discovered that plants of the species Larrea divaricata contain nordihydroguaiaretic acid, a compound of phenolic nature, having the empirical formula $C_{18}H_{22}O_4$ and the structure:

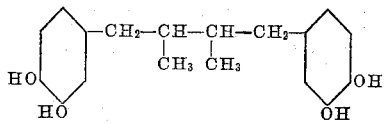

According to the Geneva nomenclature, nordihydroguaiaretic acid may be designed beta, gamma-dimethyl, alpha delta-bis (3,4-dihydroxyphenyl) butane. The melting point of this material is 183–184° C.

In addition to nordihydroguaiaretic acid, plant material of the species Larrea divaricata also appears to contain other phenolic constituents, rubber-like substances, pigments, cellulose and various other complexes, which are undesirable contaminants insofar as concerns many uses of the nordihydroguaiaretic acid component, although some of such other constituents are in themselves useful.

It is an object of the invention to provide a convenient, efficient method of separating the constituents of natural plant material of the species Larrea divaricata, and a particular object to provide methods of making extracts having a high concentration of nordihydroguaiaretic acid.

The present invention involves an improvement on previous methods of extraction and purification and results in the isolation of substantially pure nordihydroguaiaretic acid in good yields and with a minimum of processing.

In general the invention comprises the preparation of a crude extract of nordihydroguaiaretic acid from a suitable source material such as the plant Larrea divaricata, which crude extract is then purified to yield crystalline nordihydroguaiaretic acid in accordance with a special procedure outlined in further detail hereinafter.

The crude extract may be prepared by any suitable procedure. I prefer, however, to employ one of the processes outlined in my copending applications Ser. No. 478,321, filed March 6, 1943, and Ser. No. 490,149, filed June 9, 1943. According to the first mentioned application the crude extract may be prepared as follows:

The plant material consisting of small twigs, leaves, stems, flowering tops, some seed, or the whole plant, if desired, is dried either by air drying or artificial drying. Foreign material such as adherent dirt and the like is removed and the plant material is then preferably, though not necessarily, ground in any suitable mill, such as a hammer mill, a Jacobson mill, or the like, until a fine powder results. Grinding can be accomplished without difficulty, and the powder is fairly dense. The size of grinding is preferably 10 to 100 mesh, 20 to 80 mesh being suitable for most efficient extraction. The powder is yellowish-green in color and has an odor which is not unpleasant when dilute, but is somewhat disagreeable when concentrated. The powdered material may be stored in tightly closed tins for a period of weeks without appreciable deterioration. The whole plant may, if desired, be extracted but for the most efficient and thorough utilization of the raw material it should be ground to a powder.

The plant material is then extracted preferably by percolation or continuous extraction with a solvent capable of extracting the resinous constituent of the plant material. The suitability of any prospective solvent may be gauged by testing an extract solution made with the solvent in question for the color reactions characteristic of catechol using a ferric chloride test solution (known in the pharmacopeia as ferric chloride T. S.) in the presence of an aqueous solution of sodium carbonate test solution. Thus to determine the suitability of a prospective solvent, one may make a test extraction and then to the solvent extract add a small quantity of ferric chloride T. S. in accordance with the usual technique for testing for the color reactions characteristic of catechol. Where the desired plant fractions are present, they are revealed even in very dilute strengths. Thus, a small drop of plant extract may be diluted to 15 to 20 cc. with methyl alcohol and this is used for the color tests.

It may be explained that the characteristic green-blue-violet color changes characteristic of catechol may not be very distinct when ferric chloride T. S. alone is used, and so as to bring out the color reactions (and thus make the test more certain) there is added a dilute, preferably freshly prepared, solution of sodium carbonate. This is added drop by drop to the color test solution after ferric chloride T. S. is added. Where the plant extract solvent in question is suitable for the extraction, the much diluted sample of extract solution will be fairly clear and only slightly tinted, a faint olive upon addition of ferric chloride T. S. Upon addition of sodium carbonate, drop by drop, the color changes to an emerald green (a critical color phase, easily passed). As more sodium carbonate is added, the color changes through to a deep blue-green to blue, blue-violet and finally deep violet-red (wine) color. Where the prospective plant extraction solvent is not suitable, these characteristic reactions do not occur.

The solvent may thus be characterized as one capable of yielding an extract of *Larrea divaricata* giving the color reactions characteristic of catechol using ferric chloride T. S. (10% aqueous ferric chloride solution) in the presence of sodium carbonate (1% freshly prepared aqueous sodium carbonate solution).

Exemplary suitable solvents are in general organic solvents containing a halogen, oxygen or nitrogen in the molecular structure or mixtures of these solvents. Thus, oxygen containing organic solvents such as the alkyl ethers, notably ethyl ether, isopropyl ether, butyl ether, and the like, cyclic ethers such as dioxane or a ketone such as acetone, may be used. Other oxygen containing organic solvents are the alcohols, such as methyl, ethyl, propyl, amyl, isopropyl, and isoamyl alcohols or the glycols, such as propylene glycol; alkyl esters, such as ethyl acetate, or other low boiling acetates; acids such as glacial acetic acid, all are suitable. Likewise the halogen containing organic solvents such as chloroform, dichloromethane, methlylene dichloride, ethylene dichloride and ethylene dibromide may be used. Similarly the nitrogen containing organic solvents such as pyridine and "Morpholine," nitro-methane, nitro-ethane and nitro-propane may be used. Ethyl ether is preferred where suitable equipment is available.

Some of the foregoing solvents are more efficacious than others and widely different extraction periods are therefore necessary. Thus, when using di-ethyl ether, the extraction is as complete as necessary for practical purposes in 1½ hours to 4 hours, whereas some of the halogenated solvents, chloroform, ethylene dichloride and the like, require from 8 hours to a day or more for extraction.

The extract is then filtered to remove the extraneous material and the solvent is partially or completely removed by evaporation or distillation. The solvent removal step, the temperatures of distillation or evaporation, and other details depend upon the characteristics of the particular solvent used and are obvious once the solvent has been selected as hereinbefore taught. Thus where ethyl ether is used, simple distillation or evaporation is sufficient for its removal. For economy, the solvent should be recovered.

After removal of all or nearly all of the solvent there remains a dark, yellowish-brown, tarry mass which is designated herein as the "crude" or "primary" extract. This extract contains substantial amounts of nordihydroguaiaretic acid (probably 25–35%), and some fats, waxes, rubber-like materials, pigments, some of which are flavone-like materials, and other fractions. It may be pointed out at this juncture that there is no accurate method available for the quantitative determination of nordihydroguaiaretic acid, and the content is therefore judged from the amount of crystalline nordihydroguaiaretic acid recovered, as hereinafter described from a given quantity of the primary extract.

According to the later application referred to above the crude extract may may prepared as follows:

There may be utilized the whole plant, including the entire woody portions, leaves, stems, flowers and buds. The plant material may be used either in the dried or green states, the latter being preferred. The plant material is preferably not ground, although chopped or packed plant material may be used for convenience in handling.

The plant material is extracted with an aqueous solution of alkali hydroxide such as sodium hydroxide, potassium hydroxide or with ammonium hydroxide. Sodium and potassium hydroxides are preferred because of their excellent extractive ability, low cost and availability. The aqueous hydroxide solution may be used either weak or strong, preferably a concentration of from 2 to 10%, and to the aqueous solution there is added a reducing agent, preferably sodium hydrosulfite, the percentage of the latter being about half of the percentage of the hydroxide, viz. 1–5%, although this is not critical. The reducing agent serves to protect the ortho hydroquinone nuclei of the nordihydroguaiaretic acid from oxidation duing the alkali extraction. Sodium hydrosulfite serves admirably for this purpose but other reducing agents of equivalent strength, capable of reducing orthoquinones to the corresponding ortho hydroquinones under alkaline conditions, may be used. The extraction is made at room temperature, viz. 15–25° C. although slightly elevated temperatures are not harmful.

Extraction is carried out by leaching or percolation, and is usually complete in from 15 minutes to 1 hour. If desired, the extraction may be carried out by a counter-current procedure in a number of vessels, the aqueous hydroxide-reducing agent solution being removed from the first vessel and conveyed onto the plant material of the second vessel after a few minutes extraction in the first vessel. Thereafter, a fresh sodium hydroxide-reducing agent solution is conveyed to the first vessel and after a suitable interval the leaching solution of the second vessel is removed and conveyed into a third vessel containing fresh plant material while the aqueous hydroxide-reducing agent solution is likewise conveyed from the first vessel to the second vessel. This may be repeated through any number of vessels, the aqueous hydroxide-reducing agent solution being permitted to remain in each vessel for a short time, after which it is removed and conveyed to the next succeeding vessel in the series. After from 2 to 4 leachings of the plant material in the first vessel, the extraction of the plant material therein is complete and it is removed and discarded whereupon fresh plant material is placed in this vessel and it becomes the last in the series. By this counterflow procedure, efficient use may be made of the aqueous hydroxide-reducing agent solution.

The leaching liquid containing the extracted material is then acidulated with any suitable inorganic or organic acid, hydrochloric, sulfuric and glacial acetic acids being exemplary. It is desired that the acidulation be carried to the point at which a flocculation appears in the extraction solution, at which point the solution is just neutral or a trifle basic when tested with litmus. In the event too much acid is added, a considerable precipitation will occur but there still remains an appreciable dispersion of colloidal particles. However, no harm is done by over acidulation, and should such be encountered, it is only necessary to add a dilute alkali solution to decrease the acidity slowly until the flocculation again appears. At the flocculation stage, there still remains in the extraction liquor a considerable amount of suspended matter which imparts to the liquor a somewhat cloudy appearance. However, the flocculent precipitate represents a good portion of the desired constituents and this settles out after standing for 12 hours or more. Due to consideration of cost of raw material, it is usually unnecessary to recover the suspended matter in the extraction liquor but this may be recovered and used if desired.

The aqueous extraction solution, neutralized as indicated, may also be treated by centrifuging in order to facilitate separation of the flocculent precipitate. Also, under some conditions, a fairly tough curd develops and agglomerates. Where settling is used, a longer period of settling, as for example a week or more, causes the flocculent precipitate to settle in a fairly solid mass and this is desirable since it is useful to remove as large an amount of water as is possible at this stage.

Crude extracts thus prepared or prepared by other procedures which result in crude extracts of the same type, can then be further processed in accordance with the following method:

A solution of crude nordihydroguaiaretic acid together with accompanying impurities is prepared by dissolving the crude material in any suitable organic solvent. As the solvent for the crude extract at this stage, I prefer to use ethyl ether or isopropyl ether, although other ethers such as beta, beta dichlor-diethyl ether or dichlor-dimethyl ether serve almost as well, and being less volatile present less fire hazard. These latter ethers are, however, much more expensive. The solution of crude extract is mixed with a quantity of a halogenated hydrocarbon to form a homogeneous solution, and the original solvent that was used for dissolving the crude extract is then removed. The removal of the original solvent may be accomplished in any of a number of suitable ways. For example, where the original solvent is more volatile than the halogenated hydrocarbon, it may be removed by simple distillation. Where the original solvent is water miscible it may be removed by washing with water. Other suitable methods of removing the original solvent will be apparent to those skilled in the art. The solution of nordihydroguaiaretic acid in halogenated hydrocarbon remaining after the removal of the original solvent is then concentrated to a small volume at which point it has the consistency of a thin syrup. The mixture is cooled and stirred, and crystallization begins. The crystallization of nordihydroguaiaretic acid usually occurs in a few minutes but may require 24–48 hours to be complete. The semi-solid crystalline mass is composed of crystallized nordihydroguaiaretic acid, crystallized and dissolved impurities, principally phenolics, and a small amount of halogenated hydrocarbon. The semisolid mass is then treated with a small quantity of preferably hot halogenated hydrocarbon, thoroughly stirred and rapidly filtered, as on a suction filter. The crystalline mass on the filter may then be washed repeatedly with small volumes of hot halogenated hydrocarbon to leave a residue of substantially pure nordihydroguaiaretic acid in a good yield.

The following specific examples, which are not to be construed as limiting, will serve to illustrate the invention:

Example I

Two hundred (200) grams of the coarsely powdered *Larrea divaricata* was percolated with ether (25° C.) and about 1000 cc. of percolate collected. The percolate was concentrated to a volume of about 100 cc. and allowed to cool to room temperature over night. The waxes which were present then crystallized and could be conveniently removed by filtration although this step may be omitted if desired. The filtrate can then be concentrated until 5 to 10 cc. of ether remain in the resulting extract. 10 to 75 cc. of ethylene dichloride were then added and the mixture heated on the steam bath until the extract had a consistency of a thin syrup. At this point the ether had been removed and about 5 cc. of ethylene dichloride remained. The extract was then cooled and stirred. Crystallization of nordihydroguaiaretic acid usually took place in a few minutes although it may be necessary to wait for 24 to 48 hours before complete crystallization has been effected. The semi-solid crystalline mass was then gently warmed on the steam bath and 5 to 10 cc. of warm ethylene dichloride was added and the mixture thoroughly stirred. The mixture was then filtered by means of suction and the crystalline mass washed with successive portions 5 cc. each of hot ethylene dichloride (total 25–50 cc). The nordihydroguaiaretic acid that remained on the filter paper was finely crystalline, light in color and of an excellent quality. Yield 4.5 grams.

Example II

A primary extract was prepared by percolation of the plant material *Larrea divaricata* with cold (25° C.) methyl or ethyl alcohol. The alcohol was then removed and the solid extract dissolved in 200 cc. of cold (25° C.) ether. The resultant mixture was then filtered and the filtrate worked up in the same manner as the filtrate in Example I. Yield 4.5 grams of a high purity nordihydroguaiaretic acid.

Example III

A primary extract from 200 grams of drug made with sodium hydroxide and sodium hydrosulfite as described in my preceding application Ser. No. 490,149 was mixed with 25 to 35 cc. of methyl alcohol or ethyl alcohol. If the primary extract has not been thoroughly acidulated in its preparation, 1 cc. of 50% strength (commercial) hypophosphorus acid can be added to this mixture. Hypophosphorus acid is a powerful reducing agent capable of accomplishing this function under acidic conditions. It serves to prevent oxidation of the nordihydroguaiaretic acid during the purification. Heat may or may not be applied to this mixture. The cool (25° C.) mixture was then diluted slowly with continuous stirring with 200 cc. of ether. The supernatant liquid was then separated from the insoluble matter present and placed in a separatory funnel. 100 to 150 cc. of water were then added and the mixture carefully agitated. After separation into two layers, the lower aqueous-alcoholic layer was removed and the ether layer washed once or twice with 25 cc. portions of water. The ether layer was then concentrated on the steam bath to the consistency of a thin syrup. This preparation was then treated with ethylene dichloride and then processed further as described above in Example I. 6–7 grams of nordihydroguaiaretic acid were obtained that were light in color and finely crystalline.

*Example IV*

A primary extract from 200 grams of drug was made with sodium hydroxide and sodium hydrosulfite as described in my preceding application. This primary extract was then acidulated, care being taken to obtain a thoroughly acidulated product. Hypophosphorus acid was very suitable for final acidulation as explained in Example III. This extract was dried and powdered. It was digested (warm) with 100 cc. portions of diethyl ether containing 10% methyl alcohol. The mixture was filtered and the filtrate saved. This procedure was repeated several times and the filtrates combined. 100 to 150 cc. of water were then added to the filtrate and the mixture thoroughly agitated. After separation into two layers, the lower aqueous-alcoholic layer was removed and the other layer washed once or twice with 25 cc. portions of water. The ether layer was then concentrated on the steam bath to the consistency of a thin syrup. This preparation was then treated with ethylene dichloride and then processed further as described above in Example I. 6–7 grams of nordihydroguaiaretic acid were obtained that were light in color and finely crystalline.

*Example V*

A primary extract from 200 grams of drug made with sodium hydroxide and sodium hydrosulfite as described in my preceding application Ser. No. 490,149 was mixed with 25 to 35 cc. of methyl alcohol or ethyl alcohol. If the primary extract has not been thoroughly acidulated in its preparation, 1 cc. of 50% strength (commercial) hypophosphorus acid can be added to this mixture. Hypophosphorus acid is a powerful reducing agent capable of accomplishing this function under acidic conditions. It serves to prevent oxidation of the nordihydroguaiaretic acid during the purification. Heat may or may not be applied to this mixture. The cool (25° C.) mixture was then diluted slowly with continuous stirring with 200 cc. of nitro-methane. The supernatant liquid was then separated from the insoluble matter present and placed in a separatory funnel. 100 to 150 cc. of water were then added and the mixture carefully agitated. After separation into two layers, the lower aqueous-alcoholic layer was removed and the nitro-methane layer washed once or twice with 25 cc. portions of water. The nitro-methane layer was concentrated by heating under vacuum until practically all the solvent had been removed at which point the residue was a solid crystalline mass of orange color. This was mixed up with warm ethylene dichloride and the ethylene dichloride filtered off and then washed again with warm ethylene dichloride while on the filter. The dry nordihydroguaiaretic acid was very light buff color. Yield 3.75%.

*Example VI*

A primary extract from 200 grams of drug was made with sodium hydroxide and sodium hydrosulfite as described in my preceding application. Care was taken to obtain a thoroughly acidulated product with hypophosphorus acid as in Examples III and IV. This extract was dried and powdered. It was placed in a Soxhlet extractor and extracted continuously for 3 hours with 200 cc. of ether. The ether was removed by evaporating until a thin syrupy extract was obtained. This extract was treated with ethylene dichloride and processed further as described in Example I. 6–7 grams (3–3½%) of nordihydroguaiaretic acid were obtained that were light in color, fine crystals and excellent quality and purity.

A peculiar phenomenon appears to be involved in the process of this invention. When it is attempted to crystallize nordihydroguaiaretic acid from a solution of it and ordinarily occurring impurities in an ordinary solvent such as alcohol or ether, no crystallization occurs, but rather the whole mass appears to solidify to an amorphous somewhat plastic body and no separation of the nordihydroguaiaretic acid can be effected. When, however, the crude extract is transferred from its original solvent to the halogenated hydrocarbon or nitro-aliphatic solvent, and the solvent partly evaporated, a supersaturated solution appears to result from which the crystalline nordihydroguaiaretic acid can readily be isolated. Apparently the manner in which the supersaturated solution is prepared and the nature of the solvent employed affect the balance of the physical system such that a crystalline precipitate is obtained. Whatever the explanation of the phenomenon, it does occur and provides a simple and economical method of isolating nordihydroguaiaretic acid from a crude extract and involves a tremendous advance over the processes heretofore available for the isolation of this material.

Apparently any halogenated hydrocarbon may be used as the solvent from which the nordihydroguaiaretic acid is crystallized. Chloroform, propylene dichloride, methylene dichloride and ethylene dichloride are particularly suited and of these, ethylene dichloride appears to possess characteristics best suited for this purpose.

The filtrate containing halogenated solvent and halogenated solvent washings may be collected, combined and concentrated to yield a second crop of nordihydroguaiaretic acid. This procedure may be repeated until no more crystals are obtained. These crops are of lesser purity, ranging from ecru to pale yellow in color, but are suitable for many purposes where a high degree of purity and white color are not essential.

It will be apparent that numerous variations may be made within the scope of the invention without departing from the spirit thereof. For example, time periods, temperatures, amounts of solvents and the like, may be varied from those specifically set forth in the specific examples. It is to be understood therefore that the invention is to be limited only by the appended claims.

What I claim is:

1. Process of separating nordihydroguaiaretic acid from a crude extract containing nordihydroguaiaretic acid and impurities dissolved in a low aliphatic ether solvent which comprises adding ethylene dichloride to said extract, evaporating said ether solvent and a portion of said ethylene dichloride until the solution is reduced to the consistency of a thin syrup, crystallizing nordihydroguaiaretic acid and washing impurities from the crystallized nordihydroguaiaretic acid by means of ethylene dichloride.

2. Process of separating nordihydroguaiaretic acid from a crude extract containing nordihydroguaiaretic acid and impurities dissolved in a low aliphatic alcohol which comprises adding a low aliphatic ether to said extract, separating the impurities precipitated thereby, removing the alcohol from said extract to leave the soluble constituents dissolved in the ether, concentrating the solution thus formed, adding ethylene dichloride thereto and evaporating the resulting mixture to a consistency of a thin syrup, crystallizing nordihydroguaiaretic acid therefrom, and washing impurities from said nordihydroguaiaretic acid by means of ethylene dichloride.

3. Process of separating nordihydroguaiaretic acid from a crude extract containing nordihydroguaiaretic acid and impurities dissolved in a lower aliphatic ether solvent therefor, which comprises adding a halogenated lower aliphatic hydrocarbon solvent which is miscible with said ether solution, removing said ether solvent and part of said halogenated hydrocarbon solvent, and crystallizing nordihydroguaiaretic acid from the remaining halogenated hydrocarbon.

4. Process of separating nordihydroguaiaretic acid from a crude extract containing nordihydroguaiaretic acid and impurities dissolved in a lower aliphatic ether solvent therefor, which comprises adding a chlorinated lower aliphatic hydrocarbon solvent which is miscible with said ether solution, removing said ether solvent and part of said chlorinated hydrocarbon solvent, and crystallizing nordihydroguaiaretic acid from the remaining chlorinated hydrocarbon.

5. Process according to claim 3 in which the lower aliphatic ether is isopropyl ether.

6. Process according to claim 3 in which the halogenated lower aliphatic hydrocarbon is ethylene dichloride.

OLE GISVOLD.